United States Patent [19]
Caillat et al.

[11] Patent Number: 5,295,813
[45] Date of Patent: Mar. 22, 1994

[54] SCROLL-COMPRESSOR HAVING FLAT DRIVING SURFACES

[75] Inventors: Jean-Luc Caillat; Roger C. Weatherston, both of Dayton; James W. Bush, Sidney, all of Ohio

[73] Assignee: Copeland Corporation, Sidney, Ohio

[21] Appl. No.: 998,549

[22] Filed: Dec. 30, 1992

Related U.S. Application Data

[62] Division of Ser. No. 884,412, May 18, 1992, Pat. No. 5,219,281, which is a division of Ser. No. 649,001, Jan. 31, 1991, Pat. No. 5,114,322, which is a division of Ser. No. 387,699, Jul. 31, 1989, Pat. No. 4,992,033, which is a division of Ser. No. 189,485, May 2, 1988, Pat. No. 4,877,382, which is a division of Ser. No. 899,003, Aug. 22, 1986, Pat. No. 4,767,293.

[51] Int. Cl.⁵ .............. F04C 18/04; F04C 29/02; F16C 23/04; F16D 3/04
[52] U.S. Cl. .................. 418/55.5; 418/55.6; 418/57; 418/94; 418/182; 74/570; 384/906; 464/132
[58] Field of Search ........ 418/55.5, 55.6, 57, 418/94, 182; 74/570; 384/906; 464/132, 160

[56] References Cited

U.S. PATENT DOCUMENTS

| | | | |
|---|---|---|---|
| 1,906,142 | 4/1933 | Ekelof | 418/57 |
| 4,585,403 | 4/1986 | Inaba et al. | 418/55.5 |
| 4,609,334 | 9/1986 | Muir et al. | 418/55.5 |
| 4,743,181 | 5/1988 | Murayama et al. | 418/55.6 |

FOREIGN PATENT DOCUMENTS

| | | | |
|---|---|---|---|
| 2509536 | 9/1976 | Fed. Rep. of Germany | 418/57 |
| 60-73080 | 4/1985 | Japan | 418/55.5 |

*Primary Examiner*—John J. Vrablik
*Attorney, Agent, or Firm*—Harness, Dickey & Pierce

[57] ABSTRACT

A scroll machine has a drive that incorporates radial compliance. The radial compliance is achieved by having the crank pin drive a drive bushing via a flat surface on the crank pin which slidably engages a flat bearing insert disposed in the wall of a bore located in the drive bushing. The bore in the drive bushing is slightly oval in cross-sectional shape to permit relative sliding movement between the crank pin and the drive bushing.

21 Claims, 7 Drawing Sheets

SCROLL-COMPRESSOR HAVING FLAT DRIVING SURFACES

This is a division of U.S. patent application Ser. No. 884,412, filed May 18, 1992, now U.S. Pat. No. 5,219,281, which is a division of U.S. patent application Ser. No. 649,001, filed Jan. 31, 1991, now U.S. Pat. No. 5,114,322, which is a division of U.S. patent application Ser. No. 387,699, filed Jul. 31, 1989, now U.S. Pat. No. 4,992,033, which is a division of U.S. patent application Ser. No. 189,485, filed May 2, 1988, now U.S. Pat. No. 4,877,382, which is a division of U.S. patent application Ser. No. 899,003, filed August 22, 1986, now U.S. Pat. No. 4,767,293.

BACKGROUND AND SUMMARY

The present invention relates to fluid displacement apparatus and more particularly to an improved scroll-type machine especially adapted for compressing gaseous fluids, and to a method of manufacture thereof.

A class of machines exists in the art generally known as "scroll" apparatus for the displacement of various types of fluids. Such apparatus may be configured as an expander, a displacement engine, a pump, a compressor, etc., and many features of the present invention are applicable to any one of these machines. For purposes of illustration, however, the disclosed embodiments are in the form of a hermetic refrigerant compressor.

Generally speaking, a scroll apparatus comprises two spiral scroll wraps of similar configuration each mounted on a separate end plate to define a scroll member. The two scroll members are interfitted together with one of the scroll wraps being rotationally displaced 180 degrees from the other. The apparatus operates by orbiting one scroll member (the "orbiting scroll") with respect to the other scroll member (the "fixed scroll" or "non-orbiting scroll") to make moving line contacts between the flanks of the respective wraps, defining moving isolated crescent-shaped pockets of fluid. The spirals are commonly formed as involutes of a circle, and ideally there is no relative rotation between the scroll members during operation, i.e., the motion is purely curvilinear translation (i.e. no rotation of any line in the body). The fluid pockets carry the fluid to be handled from a first zone in the scroll apparatus where a fluid inlet is provided, to a second zone in the apparatus where a fluid outlet is provided. The volume of a sealed pocket changes as it moves from the first zone to the second zone. At any one instant in time there will be at least one pair of sealed pockets, and when there are several pairs of sealed pockets at one time, each pair will have different volumes. In a compressor the second zone is at a higher pressure than the first zone and is physically located centrally in the apparatus, the first zone being located at the outer periphery of the apparatus.

Two types of contacts define the fluid pockets formed between the scroll members: axially extending tangential line contacts between the spiral faces or flanks of the wraps caused by radial forces ("flank sealing"), and area contacts caused by axial forces between the plane edge surfaces (the "tips") of each wrap and the opposite end plate ("tip sealing"). For high efficiency, good sealing must be achieved for both types of contacts, however, the present invention is primarily concerned with tip sealing.

The concept of a scroll-type apparatus has thus been known for some time and has been recognized as having distinct advantages. For example, scroll machines have high isentropic and volumetric efficiency, and hence are relatively small and lightweight for a given capacity. They are quieter and more vibration free than many compressors because they do not use large reciprocating parts (e.g. pistons, connecting rods, etc.), and because all fluid flow is in one direction with simultaneous compression in plural opposed pockets there are less pressure-created vibrations. Such machines also tend to have high reliability and durability because of the relatively few moving parts utilized, the relative low velocity of movement between the scrolls, and an inherent forgiveness to fluid contamination.

The drive of the present invention is radially compliant with the crank pin driving a drive bushing via a flat surface on the crank pin which slidably engages a flat bearing insert disposed in the wall of a bore located in the drive bushing. The bore in the drive bushing is slightly oval in cross-sectional shape to permit relative sliding movement between the crank pin and the drive bushing.

Other advantages and objects of the present invention will become apparent to those skilled in the art from the subsequent detailed description, appended claims and drawings.

DESCRIPTION OF THE PREFERRED EMBODIMENTS

Although the principles of the present invention may be applied to many different types of scroll-type machines, they are described herein for exemplary purposes embodied in a hermetic scroll-type compressor, and particularly one which has been found to have specific utility in the compression of refrigerant for air conditioning and refrigeration systems.

Figure 1:
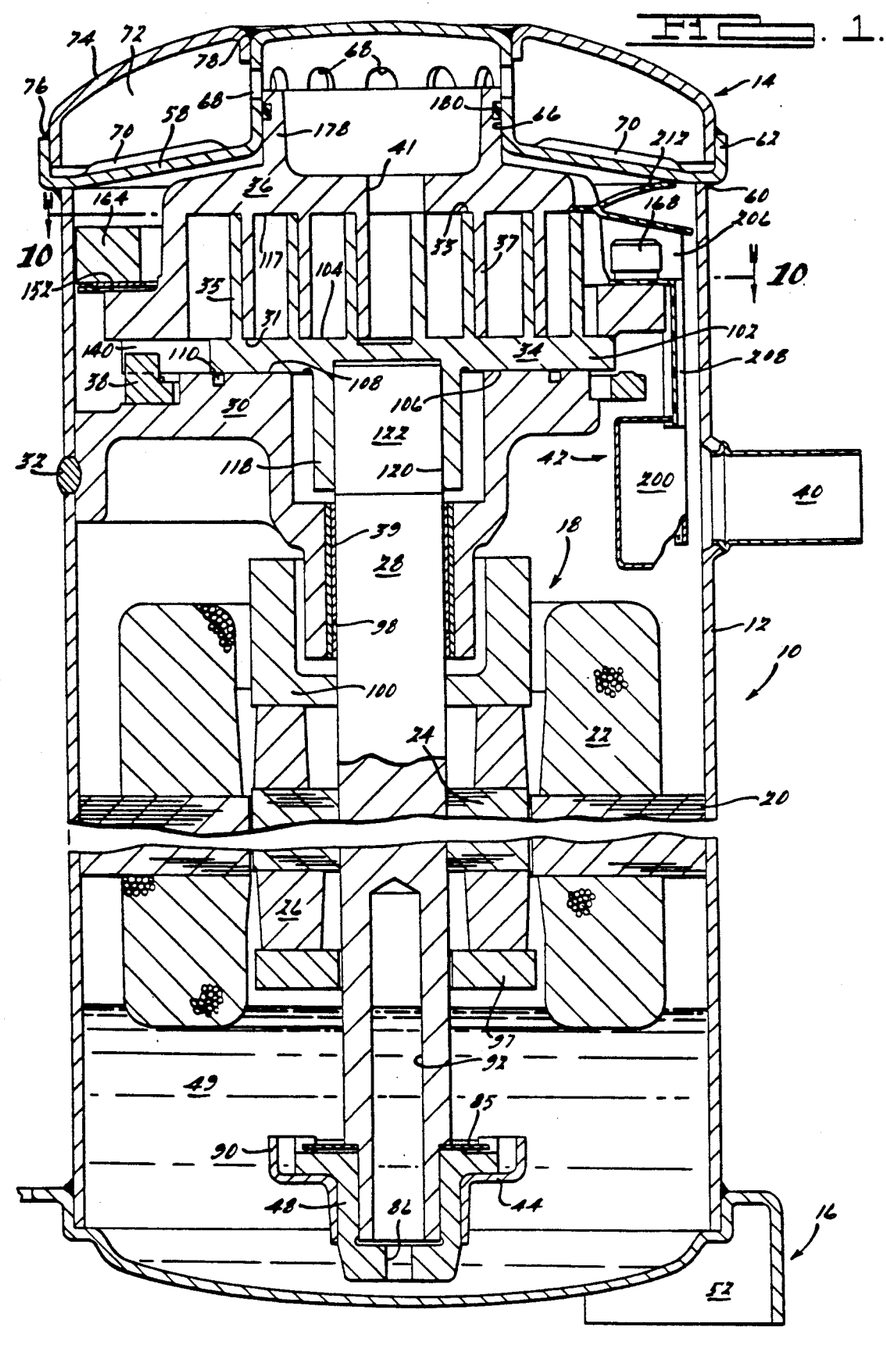
FIG. 1 is a vertical sectional view, with certain parts broken away, of a scroll compressor embodying the principles of the present invention, with the section being taken generally along line 1—1 in FIG. 3 but having certain parts slightly rotated.
Figure 2:
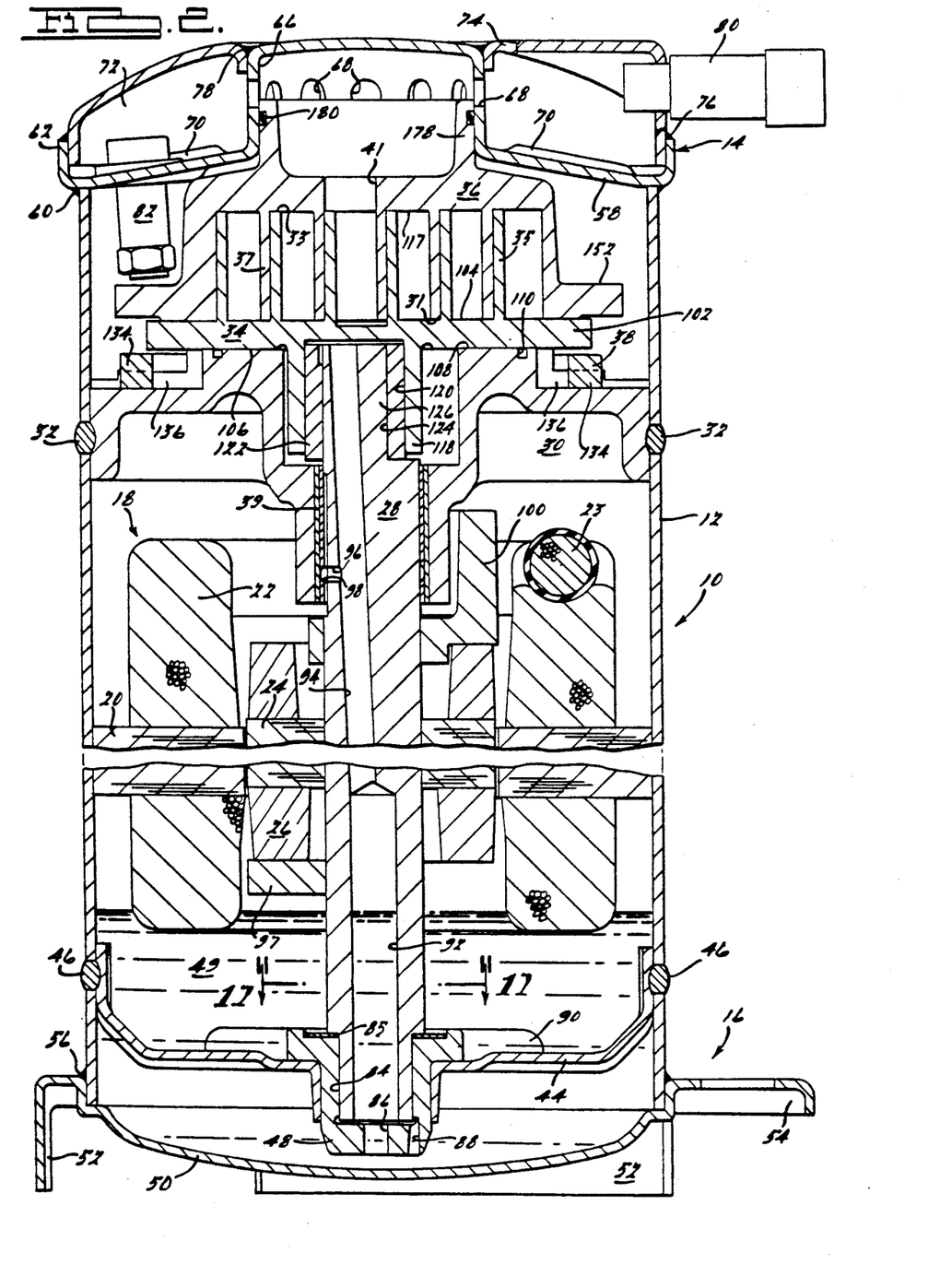
FIG. 2 is a similar sectional view taken generally along line 2—2 in FIG. 3 but with certain parts slightly rotated.
Figure 3:
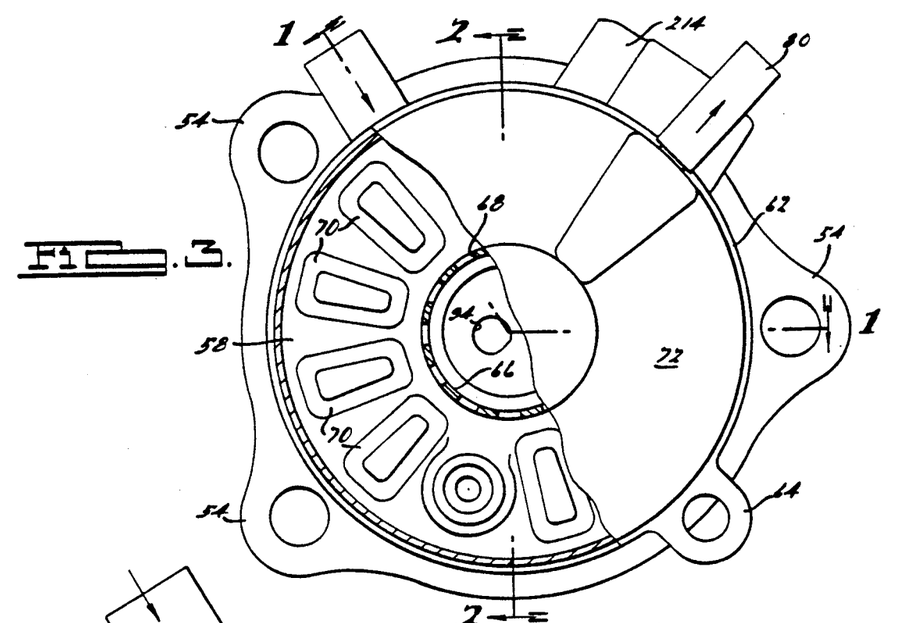
FIG. 3 is a top plan view of the compressor of FIGS. 1 and 2 with part of the top removed.

With reference to FIGS. 1-3, the machine comprises three major overall units, i.e. a central assembly 10 housed within a circular cylindrical steel shell 12, and top and bottom assemblies 14 and 16 welded to the upper and lower ends of shell 12, respectively, to close and seal same. Shell 12 houses the major components of the machine, generally including an electric motor 18 having a stator 20 (with conventional windings 22 and protector 23) press fit within shell 12, motor rotor 24 (with conventional lugs 26) heat shrunk on a crankshaft 28, a compressor body 30 preferably welded to shell 12 at a plurality of circumferentially spaced locations, as at 32, and supporting an orbiting scroll member 34 having a scroll wrap 35 of a standard desired flank profile and a tip surface 33, an upper crankshaft bearing 39 of conventional two-piece bearing construction, a non-orbiting axially compliant scroll member 36 having a scroll wrap 37 of a standard desired flank profile (preferably the same as that of scroll wrap 35) meshing with wrap 35 in the usual manner and a tip surface 31, a discharge port 41 in scroll member 36, an Oldham ring 38 disposed between scroll member 34 and body 30 to prevent rotation of scroll member 34, a suction inlet fitting 40 soldered or welded to shell 12, a directed suction assembly 42 for directing suction gas to the compressor inlet, and a lower bearing support bracket 44 welded at each end to shell 12, as at 46, and supporting a lower crankshaft bearing 48 in which is journaled the lower end of crankshaft 28. The lower end of the compressor constitutes a sump filled with lubricating oil 49.

Lower assembly 16 comprises a simple steel stamping 50 having a plurality of feet 52 and apertured mounting flanges 54. Stamping 50 is welded to shell 12, as at 56, to close and seal the lower end thereof.

Upper assembly 14 is a discharge muffler comprising a lower stamped steel closure member 58 welded to the upper end of shell 10, as at 60, to close and seal same. Closure member 58 has an upstanding peripheral flange 62 from which projects an apertured holding lug 64 (FIG. 3), and in its central area defines an axially disposed circular cylinder chamber 66 having a plurality of openings 68 in the wall thereof. To increase its stiffness member 58 is provided with a plurality of embossed or ridged areas 70. An annular gas discharge chamber 72 is defined above member 58 by means of an annular muffler member 74 which is welded at its outer periphery to flange 62, as at 76, and at its inner periphery to the outside wall of cylinder chamber 66, as at 78. Compressed gas from discharge port 41 passes through openings 68 into chamber 72 from which it is normally discharged via a discharge fitting 80 soldered or brazed into the wall of member 74. A conventional internal pressure relief valve assembly 82 may be mounted in a suitable opening in closure member 58 to vent discharge gas into shell 12 in excessive pressure situations.

Figure 17:
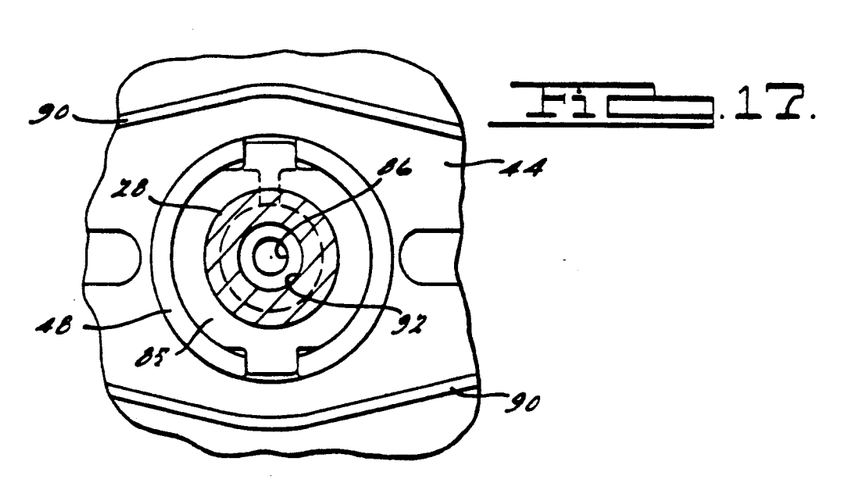
FIG. 17 is a horizontal sectional view taken substantially along line 17—17 in FIG. 2.

Considering in greater detail the major parts of the compressor, crankshaft 28, which is rotationally driven by motor 18, has at its lower end a reduced diameter bearing surface 84 journaled in bearing 48 and supported on the shoulder above surface 84 by a thrust washer 85 (FIGS. 1, 2 and 17). The lower end of bearing 48 has an oil inlet passage 86 and a debris removal passage 88. Bracket 44 is formed in the shape shown and is provided with upstanding side flanges 90 to increase the strength and stiffness thereof. Bearing 48 is lubricated by immersion in oil 49 and oil is pumped to the remainder of the compressor by a conventional centrifugal crankshaft pump comprising a central oil passage 92 and an eccentric, outwardly inclined, oil feed passage 94 communicating therewith and extending to the top of the crankshaft. A transverse passage 96 extends from passage 94 to a circumferential groove 98 in bearing 39 to lubricate the latter. A lower counterweight 97 and an upper counterweight 100 are affixed to crankshaft 28 in any suitable manner, such as by staking to projections on lugs 26 in the usual manner (not shown). These counterweights are of conventional design for a scroll-type machine.

Figure 15:
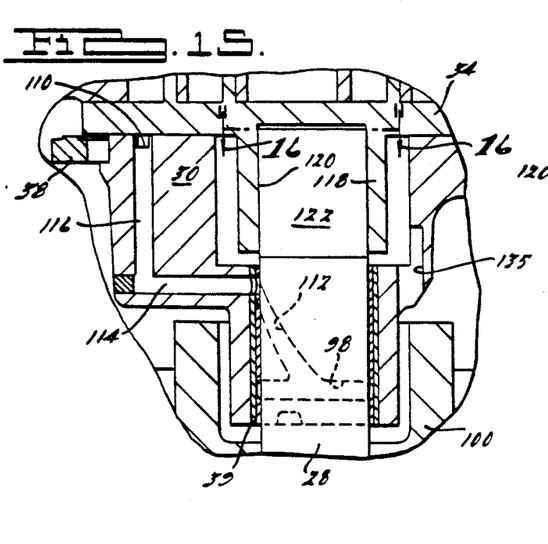
FIG. 15 is a fragmentary sectional view taken substantially along line 15—15 in FIG. 10 showing several of the lubrication passageways.

Orbiting scroll member 34 comprises an end plate 102 having generally flat parallel upper and lower surfaces 104 and 106, respectively, the latter slidably engaging a flat circular thrust bearing surface 108 on body 30. Thrust bearing surface 108 is lubricated by an annular groove 110 which receives oil from passage 94 in crankshaft 28 via passage 96 and groove 98, the latter communicating with another groove 112 in bearing 39 which feeds oil to intersecting passages 114 and 116 in body 30 (FIG. 15). The tips 31 of scroll wrap 37 sealingly engage surface 104, and the tips 33 of scroll wrap 35 in turn sealingly engage a generally flat and parallel surface 117 on scroll member 36.

Figure 16:
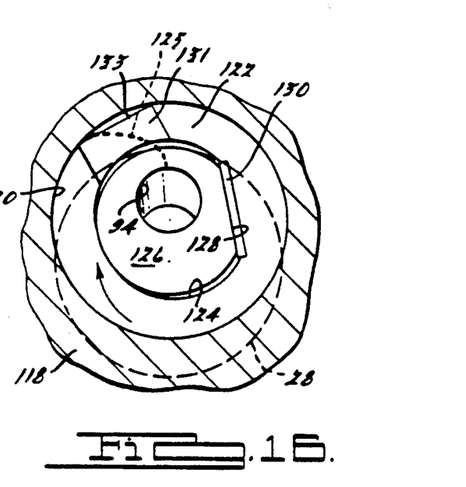
FIG. 16 is a sectional view taken substantially along line 16—16 in FIG. 15.

Integrally depending from scroll member 34 is a hub 118 having an axial bore 120 therein which has rotatively journaled therein a circular cylindrical unloading drive bushing 122 having an axial bore 124 in which is drivingly disposed an eccentric crank pin 126 integrally formed at the upper end of crankshaft 28. The drive is radially compliant, with crank pin 126 driving bushing 122 via a flat surface 128 on pin 126 which slidably engages a flat bearing insert 130 disposed in the wall of bore 124. Rotation of crankshaft 28 causes bushing 122 to rotate about the crankshaft axis, which in turn causes scroll member 34 to move in a circular orbital path. The angle of the flat driving surface is chosen so that the drive introduces a slight centrifugal force component to the orbiting scroll, in order to enhance flank sealing. As illustrated in FIG. 16, flat surface 128 is angled outward from the line connecting the center of crankshaft 28 with the center of crank pin 126 to produce this slight centrifugal force. Bore 124 is cylindrical, but is also slightly oval in cross-sectional shape to permit limited relative sliding movement between the pin and bushing, which will in turn permit automatic separation and hence unloading of the meshing scroll flanks when liquids or solids are ingested into the compressor.

The radially compliant orbital drive of the present invention is lubricated utilizing an improved oil feeding system. Oil is pumped by pump passage 92 to the top of passage 94 from which it is thrown radially outwardly by centrifugal force, as indicated by dotted line 125. The oil is collected in a recess in the form of a radial groove 131 located in the top of bushing 122 along path 125. From here it flows downwardly into the clearance space between pin 126 and bore 124, and between bore 120 and a flat surface 133 on bushing 122 which is aligned with groove 131 (FIG. 16). Excess oil then drains to the oil sump 49 via a passage 135 in body 30.

Figure 13:
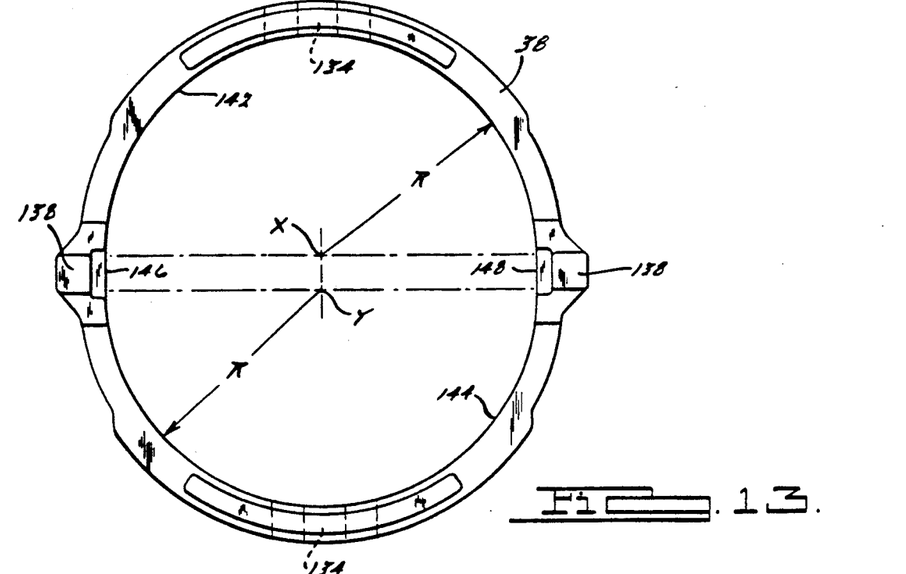
FIG. 13 is a top plan view of an improved Oldham ring forming part of the present invention.
Figure 14:
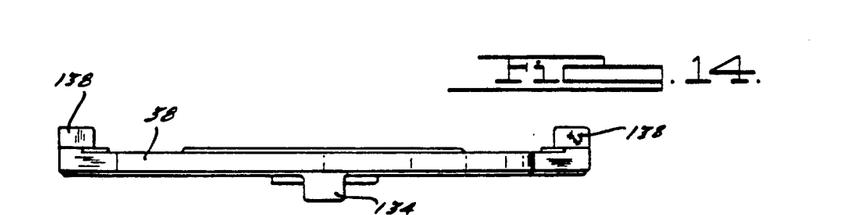
FIG. 14 is a side elevational view of the Oldham ring of FIG. 13.

Rotation of scroll member 34 relative to body 30 and scroll member 36 is prevented by an Oldham coupling, comprising ring 38 (FIGS. 13 and 14) which has two downwardly projecting diametrically opposed integral keys 134 slidably disposed in diametrically opposed radial slots 136 in body 30, and at 90 degrees therefrom two upwardly projecting diametrically opposed integral keys 138 slidably disposed in diametrically opposed radial slots 140 in scroll member 34 (one of which is shown in FIG. 1).

Ring 38 is of a unique configuration whereby it permits the use of a maximum size thrust bearing for a given overall machine size (in transverse cross-section), or a minimum size machine for a given size thrust bearing. This is accomplished by taking advantage of the fact that the Oldham ring moves in a straight line with respect to the compressor body, and thus configuring the ring with a generally oval or "racetrack" shape of minimum inside dimension to clear the peripheral edge of the thrust bearing. The inside peripheral wall of ring 38, the controlling shape in the present invention, comprises one end 142 of a radius R taken from center x and an opposite end 144 of the same radius R taken from center y (FIG. 13), with the intermediate wall portions being substantially straight, as at 146 and 148. Center points x and y are spaced apart a distance equal to twice the orbital radius of scroll member 34 and are located on a line passing through the centers of keys 134 and radial slots 136, and radius R is equal to the radius of thrust bearing surface 108 plus a predetermined minimal clearance. Except for the shape of ring 38, the Oldham coupling functions in the conventional manner.

Figure 4:
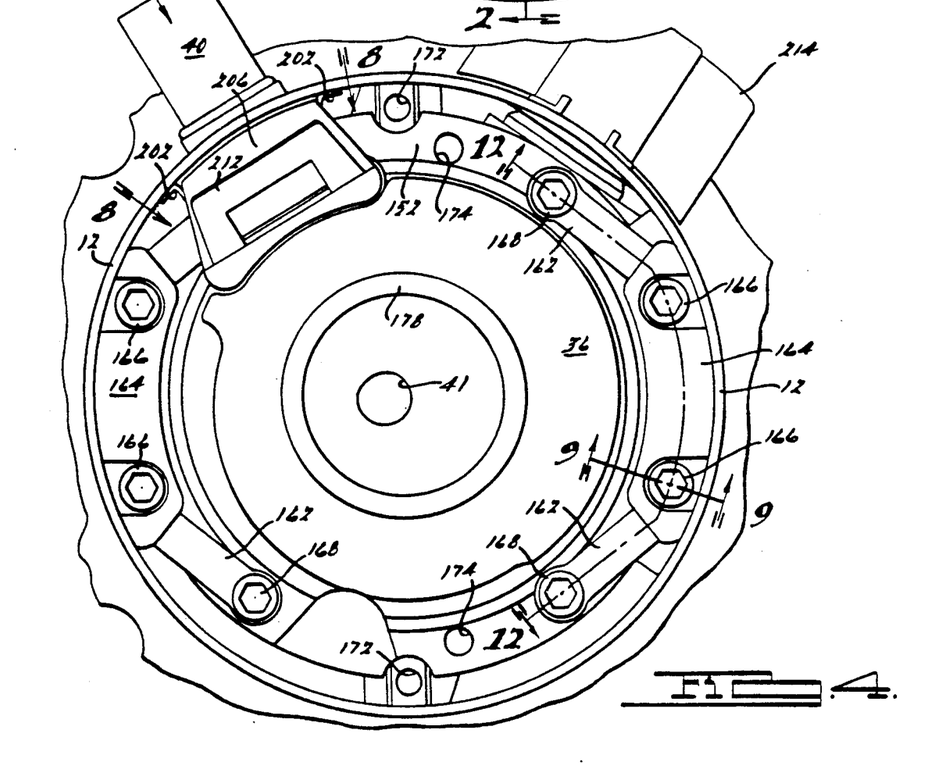
FIG. 4 is a view similar to that of FIG. 3 but with the entire upper assembly of the compressor removed.
Figures 5, 6, 7:
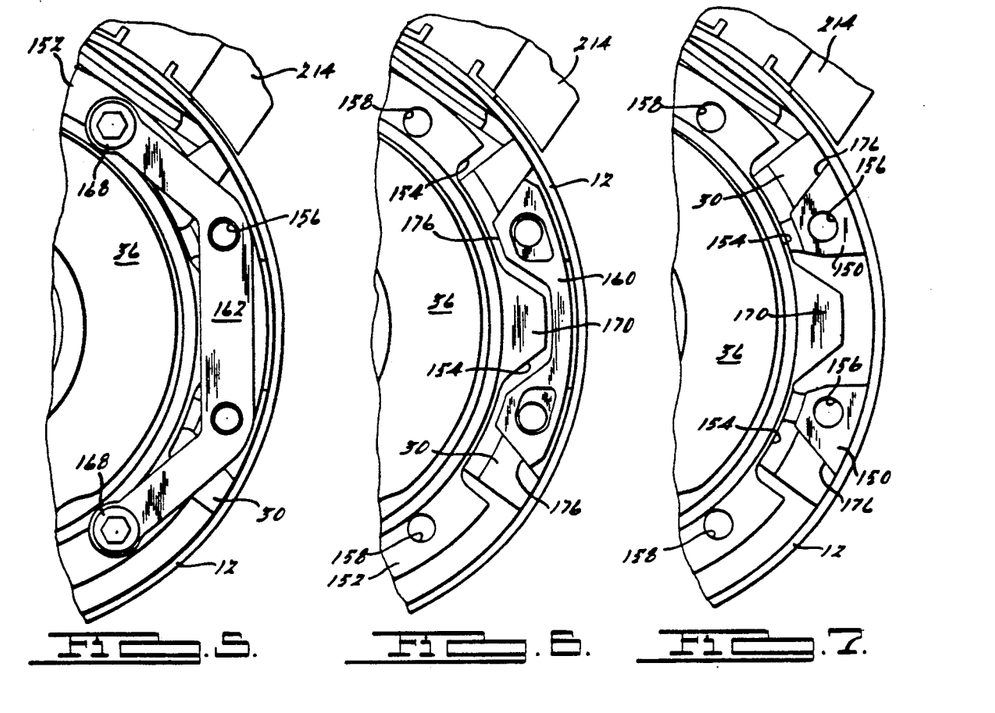
FIGS. 5, 6 and 7 are fragmentary views similar to the right hand portion of FIG. 4 with successive parts removed to more clearly show the details of construction thereof.
Figure 8:
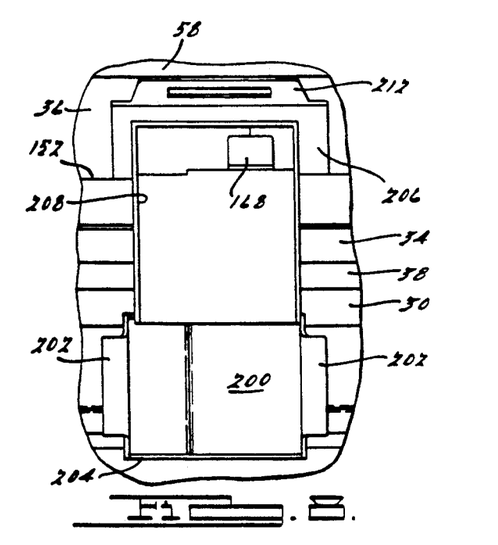
FIG. 8 is a fragmentary section view taken generally along line 8—8 in FIG. 4.
Figure 9:
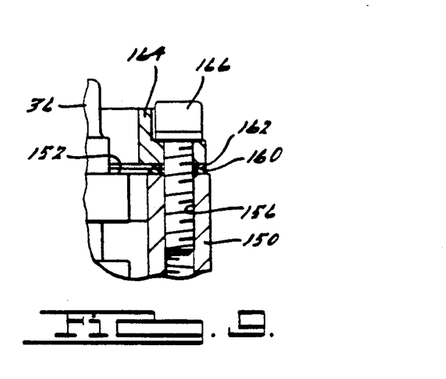
FIG. 9 is a fragmentary section view taken generally along line 9—9 in FIG. 4.

One of the more significant aspects of the present invention resides in the unique suspension by which upper non-orbiting scroll member is mounted for limited axial movement, while being restrained from any radial or rotational movement, in order to permit axial pressure biasing for tip sealing. The preferred technique for accomplishing this is best shown in FIGS. 4-7, 9 and 12. FIG. 4 shows the top of the compressor with top assembly 14 removed, and FIGS. 5-7 show a progressive removal of parts. On each side of compressor body 30 there are a pair of axially projecting posts 150 having flat upper surfaces lying in a common transverse plane. Scroll member 36 has a peripheral flange 152 having a transversely disposed planar upper surface, which is recessed at 154 to accommodate posts 150 (FIGS. 6 and 7). Posts 150 have axially extending threaded holes 156, and flange 152 has corresponding holes 158 equally spaced from holes 156.

Disposed on top of posts 150 is a flat soft metal gasket 160 of the shape shown in FIG. 6, on top of gasket 160 is a flat spring steel leaf spring 162 of the shape shown in FIG. 5, and on top of that is a retainer 164, all of these parts being clamped together by threaded fasteners 166 threadably disposed in holes 156. The outer ends of spring 162 are affixed to flange 152 by threaded fasteners 168 disposed in holes 158. The opposite side of scroll member 36 is identically supported. As can thus be visualized, scroll member 36 can move slightly in the axial direction by flexing and stretching (within the elastic limit) springs 162, but cannot rotate or move in the radial direction.

Maximum axial movement of the scroll members in a separating direction is limited by a mechanical stop, i.e. the engagement of flange 152 (see portion 170 in FIGS. 6, 7 and 12) against the lower surface of spring 162, which is backed-up by retainer 164, and in the opposite direction by engagement of the scroll wrap tips on the end plate of the opposite scroll member. This mechanical stop operates to cause the compressor to still compress in the rare situation in which the axial separating force is greater than the axial restoring force, as is the case on start-up. The maximum tip clearance permitted by the stop can be relatively small, e.g. in the order of less than 0.005" for a scroll to 3"-4" diameter and 1"-2" in wrap height.

Prior to final assembly scroll member 36 is properly aligned with respect to body 30 by means of a fixture (not shown) having pins insertable within locating holes 172 on body 30 and locating holes 174 on flange 152. Posts 150 and gasket 160 are provided with substantially aligned edges 176 disposed generally perpendicular to the portion of spring 162 extending thereover, for the purpose of reducing stresses thereon. Gasket 160 also helps to distribute the clamping load on spring 162. As shown, spring 162 is in its unstressed condition when the scroll member is at its maximum tip clearance condition (i.e. against retainer 164), for ease of manufacture. Because the stress in spring 162 is so low for the full range of axial movement, however, the initial unstressed axial design position of spring 162 is not believed to be critical.

What is very significant, however, is that the transverse plane in which spring 162 is disposed, as well as the surfaces on the body and non-orbiting scroll member to which it is attached, are disposed substantially in an imaginary transverse plane passing through the midpoint of the meshing scroll wraps, i.e. approximately mid-way between surfaces 104 and 117. This enables the mounting means for the axially compliant scroll member to minimize the tipping moment on the scroll member caused by the compressed fluid acting in a radial direction, i.e. the pressure of the compressed gas acting radially against the flanks of the spiral wraps. Failure to balance this tipping moment could result in unseating of scroll member 36. This technique for balancing this force is greatly superior to the use of the axial pressure biasing because it reduces the possibility of over-biasing the scroll members together and because it also makes tip seal biasing substantially independent of compressor speed. There may remain a small tipping movement due to the fact that the axial separating force does not act exactly on the center of the crankshaft, however it is relatively insignificant compared to the separating and restoring forces normally encountered. There is therefore a distinct advantage in axially biasing the non-orbiting scroll member, as compared to the orbiting scroll member, in that in the case of the latter it is necessary to compensate for tipping movements due to radial separating forces, as well as those due to inertial forces, which are a function of speed, and this can result in excessive balancing forces, particularly at low speeds.

The mounting of scroll member 36 for axial compliance in the present manner permits the use of a very simple pressure biasing arrangement to augment tip sealing. With the present invention this is accomplished using pumped fluid at discharge pressure, or at an intermediate pressure, or at a pressure reflecting a combination of both. In its simpler and presently preferred form, axial biasing in a tip sealing or restoring direction is achieved using discharge pressure. As best seen in FIGS. 1-3, the top of scroll member 36 is provided with a cylindrical wall 178 surrounding discharge port 41 and defining a piston slidably disposed in cylinder chamber 66, an elastomeric seal 180 being provided to enhance sealing. Scroll member 36 is thus biased in a restoring direction by compressed fluid at discharge pressure acting on the area of the top of scroll member 36 defined by piston 178 (less the area of the discharge port).

Because the axial separating force is a function of the discharge pressure of the machine (among other things), it is possible to choose a piston area which will yield excellent tip sealing under most operating conditions. Preferably, the area is chosen so that there is no significant separation of the scroll members at any time in the cycle during normal operating conditions. Furthermore, optimally in a maximum pressure situation (maximum separating force) there would be a minimum net axial balancing force, and of course no significant separation.

With respect to tip sealing, it has also been discovered that significant performance improvements with a minimum break-in period can be achieved by slightly altering the configuration of end plate surfaces 104 and 117, as well as scroll wrap tip surfaces 31 and 33. It has been learned that it is much preferred to form each of the end plate surfaces 104 and 117 so that they are very slightly concave, and if wrap tip surfaces 31 and 33 are similarly configured (i.e. surface 31 is generally parallel to surface 117, and surface 33 is generally parallel to surface 104). This may be contrary to what might be predicted because it results in an initial distinct axial clearance between the scroll members in the central area of the machine, which is the highest pressure area; however it has been found that because the central area is also the hottest, there is more thermal growth in the axial direction in this area which would otherwise result in excessive efficiency robbing frictional rubbing in the central area of the compressor. By providing this initial extra clearance the compressor reaches a maximum tip sealing condition as it reaches operating temperature.

Figures 10, 11A, 11B:
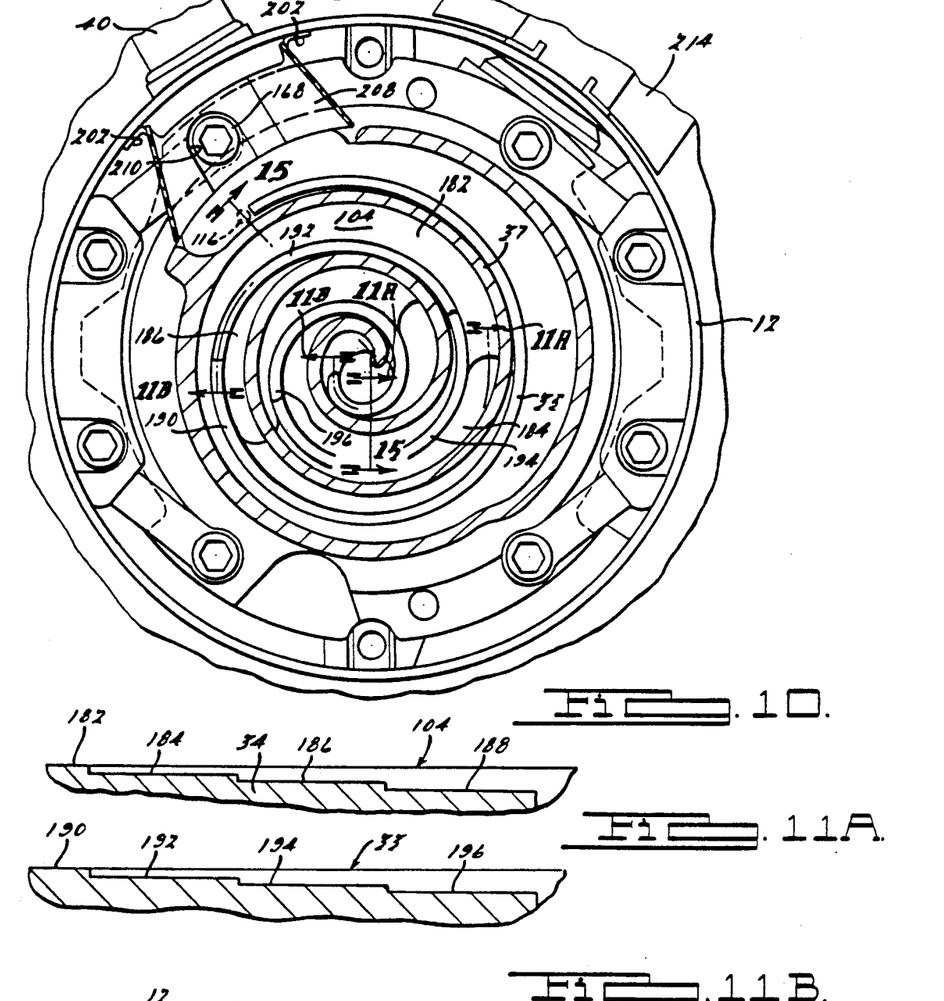
FIG. 10 is a sectional view taken generally along line 10—10 in FIG. 1.
FIGS. 11A and 11B are developed spiral vertical sectional views taken generally along lines 11A—11A and 11B—11B, respectively, in FIG. 10, with the profile shown being foreshortened and greatly exaggerated.
Figure 12:
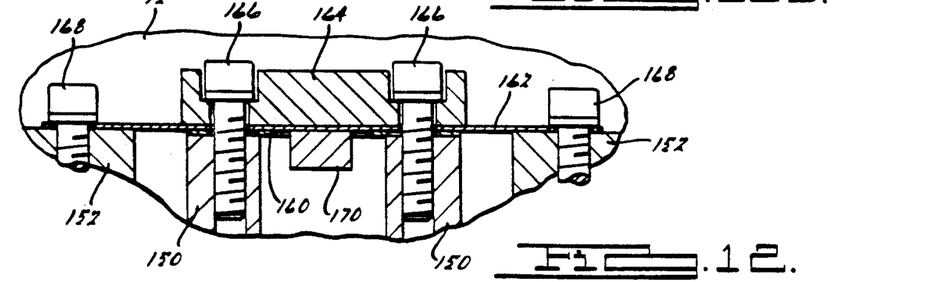
FIG. 12 is a developed sectional view taken generally along line 12—12 in FIG. 4.

Although a theoretically smooth concave surface may be better, it has been discovered that the surface can be formed having a stepped spiral configuration, which is much easier to machine. As can best be seen in grassly exaggerated form in FIGS. 11A and 11B, with reference to FIG. 10, surface 104, while being generally flat, is actually formed of spiral stepped surfaces 182, 184, 186 and 188. Tip surface 33 is similarly configured with spiral steps 190, 192, 194 and 196. The individual steps should be as small as possible, with a total displacement from flat being a function of scroll wrap height and the thermal coefficient of expansion of the material used. For example, it has been found that in a three-wrap machine with cast iron scroll members, the ratio of wrap or vane height to total axial surface displacement can range from 3000:1 to 9000:1, with a preferred ratio of approximately 6000:1. Preferably both scroll members will have the same end plate and tip surface configurations, although it is believed possible to put all of the axial surface displacement on one scroll member, if desired. It is not critical where the steps are located because they are so small (they cannot even be seen with the naked eye), and because they are so small the surfaces in question are referred to as "generally flat". This stepped surface is very different from that disclosed in assignee's prior copending application Ser. No. 516,770, filed Jul. 25, 1983, entitled "Scroll-Type Machine", now abandoned, in which relatively large steps (with step sealing between the mated scroll members) are provided for increasing the pressure ratio of the machine.

In operation, a cold machine on start-up will have tip sealing at the outer periphery, but an axial clearance in the center area. As the machine reaches operating temperature the axial thermal growth of the central wraps will reduce the axial clearance until good tip sealing is achieved, such sealing being enhanced by pressure biasing as described above. In the absence of such initial axial surface displacement, thermal growth in the center of the machine will cause the outer wraps to axially separate, with loss of a good tip seal.

The compressor of the present invention is also provided with improved means for directing suction gas entering the shell directly to the inlet of the compressor itself. This advantageously facilitates the separation of oil from inlet suction fluid, as well as prevents inlet suction fluid from picking up oil dispersed within the shell interior. It also prevents the suction gas from picking up unnecessary heat from the motor, which would cause reduction in volumetric efficiency.

The directed suction assembly 42 comprises a lower baffle element 200 formed of sheet metal and having circumferentially spaced vertical flanges 202 welded to the inside surface of shell 12 (FIGS. 1, 4, 8 and 10). Baffle 200 is positioned directly over the inlet from suction fitting 40 and is provided with an open bottom portion 204 so that oil carried in the entering suction gas will impinge upon the baffle and then drain into compressor sump 49. The assembly further comprises a molded plastic element 206 having a downwardly depending integrally formed arcuate shaped channel section 208 extending into a space between the top of baffle 200 and the wall of shell 12, as best seen in FIG. 1. The upper portion of element 206 is generally tubular in configuration (diverging radially inwardly) for communicating gas flowing up channel 208 radially inwardly into the peripheral inlet of the meshed scroll members. Element 208 is retained in place in a circumferential direction by means of a notch 210 which straddles one of the fasteners 168, and axially by means of an integrally formed tab 212 which is stressed against the lower surface of closure member 58, as best shown in FIG. 1. Tab 212 operates to resiliently bias element 206 axially downwardly into the position shown. The radially outer extent of the directed suction inlet passageway is defined by the inner wall surface of shell 12.

Power is supplied to the compressor motor in the normal manner using a conventional terminal block, protected by a suitable cover 214.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. A hermetic motor-compressor assembly comprising:
   (a) a hermetic shell having side and end walls;
   (b) first and second scroll members disposed in said shell, each of said scroll members having a spiral wrap disposed thereon, said scroll members facing one another with said wraps intermeshed with one another so that orbiting movement of said first scroll member with respect to said second scroll member will cause said wraps to create pockets of progressively decreasing volume towards the center of said scroll members;

(c) an annular hub disposed on the axially opposite side of said first scroll member from said spiral wrap, said hub defining a central bore;

(d) an annular drive bushing journaled in said bore, said drive bushing having a centrally disposed oval opening in which is defined a flat driven surface;

(e) drive means comprising a crankshaft having an eccentric crank pin disposed in said oval opening, said crank pin having a flat drive surface thereon drivingly engaging said driven surface to cause said first scroll member to orbit, said driven and driving surfaces being flat so that they can slide relative to one another within said oval opening to accommodate limited radial unloading of said scroll members, said oval opening restricting movement of said scroll member to a direction generally parallel to said flat drive surface on said crank pin; and (f) a motor disposed in said shell and connected to said crankshaft to power same.

2. A hermetic compressor as claimed in claim 1 wherein said flat surfaces are arranged so that the driving forces exerted by said crank pin add to the centrifugal forces normally on said first scroll member tending to urge said spiral wraps toward one another.

3. A hermetic compressor as claimed in claim 1 further comprising an Oldham coupling operative between said first scroll member and a fixed portion of said assembly to prevent rotation of said first scroll member.

4. A hermetic compressor as claimed in claim 1 further comprising a partition extending into the interior of said shell adjacent one end thereof and being sealingly affixed about its periphery to said shell, said partition cooperating with one of said end walls to define a discharge chamber at said one end of said shell, and means for placing gas compressed by said scroll member in fluid communication with said discharge chamber.

5. A hermetic compressor as claimed in claim 4 wherein said opening in said bushing is significantly larger than said crank pin so that during normal operation a clearance is defined entirely around said crank pin except for at said drive surface, so that said drive surface is free to slide with respect to said driven surface.

6. A hermetic compressor as claimed in claim 1 wherein said crank pin is generally circular cylindrical in configuration except for said flat drive surface.

7. A hermetic compressor as claimed in claim 1 further comprising a source of lubricating oil in said shell; means defining an oil feed passage in said crank shaft for delivering lubricating oil from said oil source to the end of said crank pin, from which it is thrown outwardly by centrifugal force upon rotation of said crankshaft; and
means defining a recess in the top of said bushing for collecting said thrown lubricating oil so that it can flow into said bore and opening for lubricating purposes.

8. A hermetic compressor as claimed in claim 7 wherein said bushing has a flat surface on the outside thereof defining an oil flow space between said bushing and said bore, said oil flow space communicating with said recess.

9. A hermetic compressor as claimed in claim 8 wherein said flat surface extends axially from the bottom to the top of said bushing.

10. A hermetic compressor as claimed in claim 7 wherein said opening is non-circular in cross-sectional configuration, whereby an oil flow space is defined between said bushing and crank pin, said last-mentioned space being in communication with said recess.

11. A hermetic compressor as claimed in claim 7 wherein said recess is a groove in the top surface of said bushing extending between said opening and the outer surface thereof.

12. A hermetic compressor as claimed in claim 7 wherein the angular position of said recess with respect to that of said oil feed passage is slightly lagging in the direction of rotation of said crankshaft.

13. A hermetic motor-compressor assembly comprising:

(a) a hermetic shell having side and end walls;

(b) first and second scroll members disposed in said shell, each of said scroll members having a spiral wrap disposed thereon, said scroll members facing one another with said wraps intermeshed with one another so that orbiting movement of said first scroll member with respect to said second scroll member will cause said wraps to create pockets of progressively decreasing volume towards the center of said scroll members;

(c) an annular hub disposed on the axially opposite side of said first scroll member from said spiral wrap, said hub defining a central bore;

(d) an annular drive bushing journaled in said bore, said drive bushing having a centrally disposed opening in which is defined a flat driven surface;

(e) drive means comprising a crankshaft having an eccentric crank pin disposed in said opening, said crank pin having a flat drive surface thereon drivingly engaging said driven surface to cause said first scroll member to orbit, said driven and driving surfaces being flat so that they can slide relative to one another to accommodate limited radial unloading of said scroll members;

(f) a motor disposed in said shell and connected to said crankshaft to power same;

(g) a source of lubricating oil in said shell;

(h) means defining an oil feed passage in said crank shaft for delivering lubricating oil from said oil source to the end of said crank pin, from which it is thrown outwardly by centrifugal force upon rotation of said crankshaft; and (f) means defining a recess in the top of said bushing for collecting said thrown lubricating oil so that it can flow into said bore and opening for lubricating purposes.

14. A hermetic compressor as claimed in claim 13 wherein said bushing has a flat surface on the outside thereof defining an oil flow space between said bushing and said bore, said oil flow space communicating with said recess.

15. A hermetic compressor as claimed in claim 14 wherein said flat surface extends axially from the bottom of the top of said bushing.

16. A hermetic compressor as claimed in claim 13 wherein said opening is non-circular in cross-sectional configuration, whereby an oil flow space is defined between said bushing and crank pin, said last-mentioned space being in communication with said recess.

17. A hermetic compressor as claimed in claim 13 wherein said recess is a groove in the top surface of said bushing extending between said opening and the outer surface thereof.

18. A hermetic compressor as claimed in claim 13 wherein the angular position of said recess with respect to that of said oil feed passage is slightly lagging in the direction of rotation of said crankshaft.

19. A hermetic compressor as claimed in claim 13 further comprising a fixed portion of said assembly having a chamber, said annular hub being disposed within said chamber, said chamber defining a drain hole for returning said thrown lubricating oil to said source of lubricating oil in said shell.

20. A hermetic motor-compressor assembly comprising:
(a) a hermetic shell;
(b) a first and a second scroll member disposed in said shell, each of said scroll members having a spiral wrap disposed thereupon, said scroll members facing one another with said wraps intermeshed with one another so that orbiting movement of said first scroll with respect to said second scroll will cause said wraps to create pockets of progressively decreasing volume towards the center of said scroll members;
(c) an annular hub disposed on the axially opposite side of said first scroll member from said spiral wrap, said hub defining a central bore;
(d) an annular drive bushing journaled in said bore, said drive bushing having a centrally disposed oval opening in which is defined a flat driven surface;
(e) drive means comprising a crankshaft having an eccentric crank pin disposed in said oval opening, said crank pin having a flat driving surface thereon drivingly engaging said flat driven surface to cause said first scroll to orbit said driven and drive surfaces being flat so that they can slide relative to one another within said oval opening to accommodate limited radial unloading of said scroll members;
(f) a motor disposed in said shell and connected to said crankshaft to power same;
(g) a source of lubricating oil in said shell;
(h) means for delivering lubricating oil from said oil source to the end of said crank pin from which it is thrown outwardly by centrifugal force upon rotation of said crankshaft;
(i) means at the top of said bushing for distributing said thrown lubricating oil into said bore or said opening for lubricating purposes; and
(j) a fixed portion of said compressor assembly having a chamber, said annular hub being disposed within said chamber, said chamber defining a drain hole for returning said thrown lubricating oil to said source of lubricating oil in said shell.

21. A hermetic motor-compressor assembly comprising:
(a) a hermetic shell having side and end walls;
(b) first and second scroll members disposed in said shell, each of said scroll members having a spiral wrap disposed thereon, said scroll members facing one another with said wraps intermeshed with one another so that orbiting movement of said first scroll member with respect to said second scroll member will cause said wraps to create pockets of progressively decreasing volume towards the center of said scroll members;
(c) an annular hub disposed on the axially opposite side of said first scroll member from said spiral wrap, said hub defining a central bore;
(d) an annular drive bushing journaled in said bore, said drive bushing having a centrally disposed oval opening in which is defined a flat driven surface;
(e) drive means comprising a crankshaft having an eccentric crank pin disposed in said oval opening, said crank pin having a flat drive surface, a majority of the surface area of said flat drive surface drivingly engaging said flat driven surface to cause said first scroll member to orbit, said driven and driving surfaces being able to slide relative to one another within said oval opening to accommodate limited radial unloading of said scroll members; and
(f) a motor disposed in said shell and connected to said crankshaft to power same.

* * * * *

UNITED STATES PATENT AND TRADEMARK OFFICE
CERTIFICATE OF CORRECTION

PATENT NO. : 5,295,813
DATED : March 22, 1994
INVENTOR(S) : Jean-Luc Caillat; Roger C. Weatherston; James W. Bush It is certified that error appears in the above-indentified patent and that said Letters Patent is hereby corrected as shown below:

Column 7, line 47, "grassly" should be -- grossly --.

Column 10, line 48, "(f)" should be -- (i) --.

Column 10, line 59, "of" (first occurrence) should be -- to --.

Signed and Sealed this

Thirtieth Day of August, 1994

Attest:

BRUCE LEHMAN

Attesting Officer

*Commissioner of Patents and Trademarks*